United States Patent
Fujiwara et al.

(10) Patent No.: US 9,874,916 B2
(45) Date of Patent: Jan. 23, 2018

(54) DEVICE REGISTRATION APPARATUS AND DEVICE REGISTRATION METHOD

(71) Applicants: Yukio Fujiwara, Kanagawa (JP); Hidenori Tomono, Kanagawa (JP); Hideaki Aratani, Kanagawa (JP)

(72) Inventors: Yukio Fujiwara, Kanagawa (JP); Hidenori Tomono, Kanagawa (JP); Hideaki Aratani, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/900,399

(22) PCT Filed: Jun. 25, 2014

(86) PCT No.: PCT/JP2014/067602
§ 371 (c)(1),
(2) Date: Dec. 21, 2015

(87) PCT Pub. No.: WO2014/208773
PCT Pub. Date: Dec. 31, 2014

(65) Prior Publication Data
US 2016/0162000 A1 Jun. 9, 2016

(30) Foreign Application Priority Data

Jun. 27, 2013 (JP) .................. 2013-135521
Feb. 10, 2014 (JP) .................. 2014-023653

(51) Int. Cl.
G06F 1/28 (2006.01)
G06F 1/26 (2006.01)
H02J 13/00 (2006.01)

(52) U.S. Cl.
CPC ............... *G06F 1/28* (2013.01); *G06F 1/266* (2013.01); *H02J 13/00* (2013.01);
(Continued)

(58) Field of Classification Search
CPC ..................................... G06F 1/32; G06F 1/26
See application file for complete search history.

(56) References Cited

U.S. PATENT DOCUMENTS

| | | | |
|---|---|---|---|
| 6,038,673 A | 3/2000 | Benn et al. | |
| 2004/0028061 A1* | 2/2004 | Sawada | H04L 29/06 370/401 |

(Continued)

FOREIGN PATENT DOCUMENTS

| | | |
|---|---|---|
| CN | 1332862 A | 1/2002 |
| JP | 2011-155445 A | 8/2011 |

(Continued)

OTHER PUBLICATIONS

Extended European Search Report dated May 23, 2016 in Patent Application No. 14818180.3.

(Continued)

*Primary Examiner* — Phil Nguyen
(74) *Attorney, Agent, or Firm* — Oblon, McClelland, Maier & Neustadt, L.L.P.

(57) ABSTRACT

A device registration apparatus includes: a transmitting unit that transmits, to an electric device, a state shift command for shifting the electric device to a specific state; a receiving unit that receives, from a power feed tap, tap identification information, electric-power information that indicates an electric power measured at each outlet, and outlet identification information for identifying an outlet that corresponds to each piece of the electric-power information; a determining unit that, when, in the electric-power information that is received during a predetermined time period after the state shift command is transmitted, electric power information of only one outlet indicates a change in an electric power when the electric device shifts to the specific state, determines that the electric device is connected to the outlet; and an associating unit that stores device identification information in (Continued)

association with outlet identification information on the outlet and the tap identification information.

6 Claims, 8 Drawing Sheets

(52) U.S. Cl.
CPC ..... *G06F 2200/261* (2013.01); *H02J 13/0013* (2013.01); *Y02B 70/3266* (2013.01); *Y02B 90/226* (2013.01); *Y02B 90/2607* (2013.01); *Y04S 20/16* (2013.01); *Y04S 20/242* (2013.01); *Y04S 40/12* (2013.01)

(56) References Cited

U.S. PATENT DOCUMENTS

| | | | | |
|---|---|---|---|---|
| 2006/0055513 | A1* | 3/2006 | French | H02J 3/14 340/7.1 |
| 2007/0118831 | A1* | 5/2007 | Kondo | E05B 47/0009 717/121 |
| 2009/0217073 | A1* | 8/2009 | Brech | G06F 1/28 713/340 |
| 2010/0109619 | A1* | 5/2010 | Tsou | H02J 3/14 323/234 |
| 2010/0164284 | A1* | 7/2010 | Lee | G06F 1/266 307/38 |
| 2011/0184586 | A1* | 7/2011 | Asano | G05B 15/02 700/297 |
| 2011/0307111 | A1 | 12/2011 | Pereira | |
| 2012/0201062 | A1* | 8/2012 | Lee | H02J 9/005 363/84 |
| 2012/0297217 | A1* | 11/2012 | Lee | G06F 1/266 713/320 |
| 2013/0031384 | A1 | 1/2013 | Yamamoto | |
| 2014/0070790 | A1 | 3/2014 | Fujiwara et al. | |
| 2014/0226851 | A1* | 8/2014 | Alberth, Jr. | G06Q 50/06 382/103 |
| 2015/0177711 | A1 | 6/2015 | Yuzurihara et al. | |

FOREIGN PATENT DOCUMENTS

| | | |
|---|---|---|
| JP | 2012-079026 A | 4/2012 |
| JP | 2013-009559 A | 1/2013 |
| JP | 2013-029965 A | 2/2013 |
| JP | 2013-048520 A | 3/2013 |
| JP | 2014-041814 A | 3/2014 |

OTHER PUBLICATIONS

International Search Report dated Aug. 12, 2014 for PCT/JP2014/067602 filed on Jun. 25, 2014.

Office Action issued in Chinese Application No. 201480038102.7 dated May 2, 2017 with English translation (17 pages).

* cited by examiner

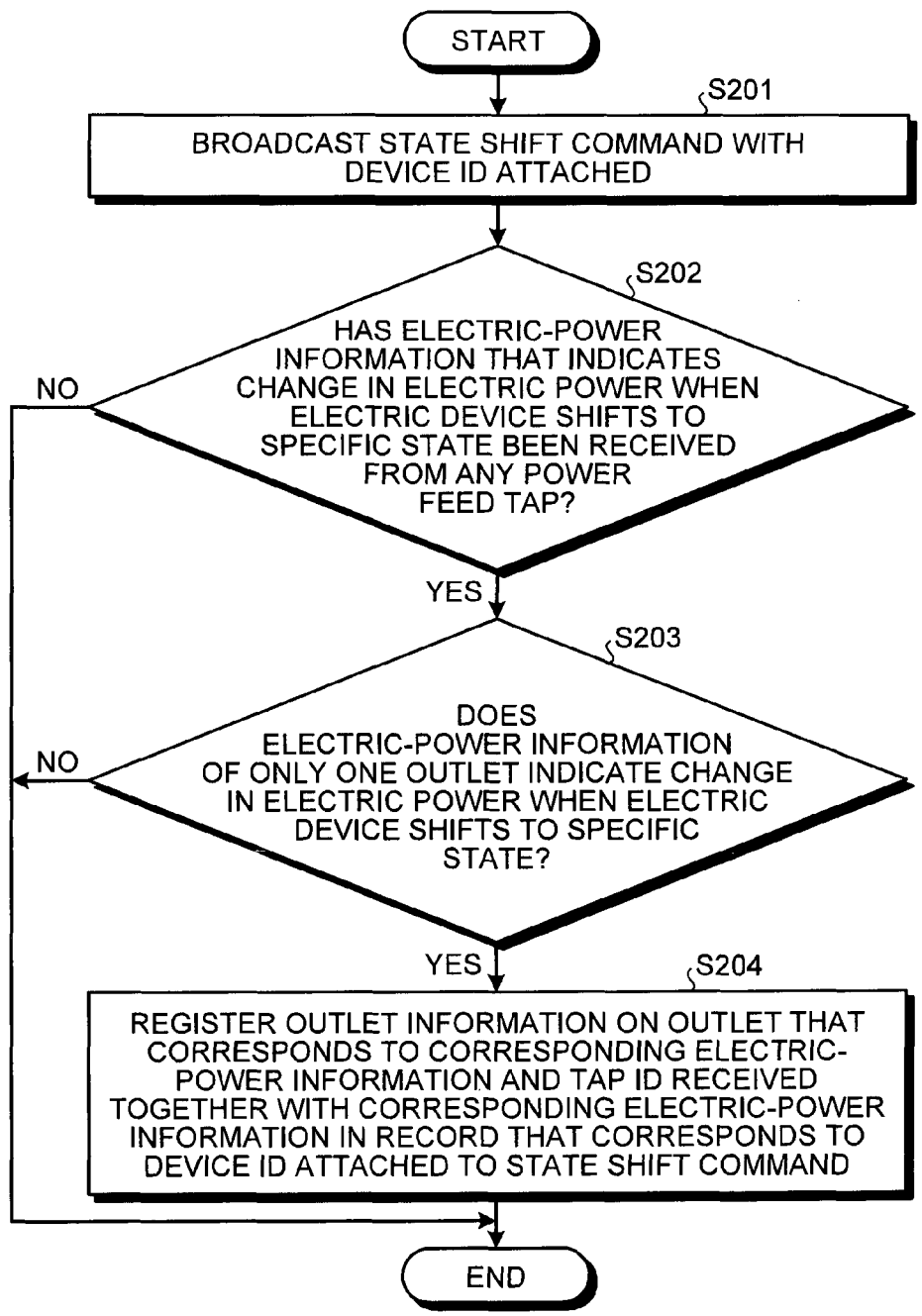

| DEVICE ID | DEVICE INFORMATION | TAP ID | OUTLET INFORMATION |
|---|---|---|---|
| ABCD | PC | AA | 2 |
| BCDE | MFP | BC | 3 |
| CDEF | PROJECTOR | EF | 1 |
| ⋮ | ⋮ | ⋮ | ⋮ |

DEVICE REGISTRATION APPARATUS AND DEVICE REGISTRATION METHOD

TECHNICAL FIELD

The present invention relates to a device registration apparatus and a device registration method.

BACKGROUND ART

There is a known power feed tap (smart tap) that measures, with respect to each outlet that is to be connected to an electric device, the electric power supplied from the outlet to the electric device and that transmits each piece of electric-power information to a server. The server is capable of determining the power consumption of each outlet of the power feed tap on the basis of the electric-power information that is received from the power feed tap. Therefore, if the server has registered therein which electric device is connected to each outlet of the power feed tap, the details on how much power is consumed by which electric device can be obtained.

Conventionally, to register, in a server, which electric device is connected to each outlet of the power feed tap, the name, or the like, of the electric device that is connected to each outlet is manually input. Therefore, there is a problem in that a registration operation is complicated and that, if there are a large number of power feed taps that require registration, especially, in an office, or if a connection configuration of the electric device connected to the power feed tap is changed due to a residence change, or the like, a lot of work is required.

As a method for automatically determining the electric device that is connected to a power feed tap, as disclosed in, for example, Patent Literature 1, there is a known method of determining the type of electric device or the details of operation of the electric device by using the characteristic data of the waveform of the electric power that is fed from the power feed tap (power tap) to the electric device. In the system that is disclosed in Patent Literature 1, a sensor server determines the type of electric device that is connected to the power feed tap and the details of operation of the electric device by using the characteristic data that is transmitted from the power feed tap, attaches the time information to a determination result, and stores them as the action information of a user of the electric device in a storage unit.

However, in the system that is disclosed in Patent Literature 1, although the type of electric device that is connected to the power feed tap and the details of operation of the electric device can be determined, it is difficult to determine which electric device is connected to which one of the outlets of the power feed tap.

In view of the foregoing, there is a need to provide a device registration apparatus and a device registration method that make it possible to automatically register the association relationship among a power feed tap, an outlet thereof, and an electric device that is connected to the outlet.

SUMMARY OF THE INVENTION

To solve the abovementioned problem and achieve the object, a device registration apparatus according to the present invention communicates with an electric device and a power feed tap that measures, with respect to each of outlets to which the electric device is to be connected, an electric power that is fed to the electric device from the outlet, the device registration apparatus comprising: a transmitting unit that transmits, to the electric device, a state shift command for shifting the electric device to a specific state; a receiving unit that receives, from the power feed tap, tap identification information for identifying the power feed tap, electric-power information that indicates an electric power that is measured at each of the outlets, and outlet identification information for identifying an outlet that corresponds to each piece of the electric-power information; a determining unit that, when, in the electric-power information that is on each of the outlets and that is received from the power feed tap during a predetermined time period after the state shift command is transmitted, electric-power information of only one outlet indicates a change in an electric power when the electric device shifts to the specific state, determines that the electric device is connected to the outlet that corresponds to the electric-power information; and an associating unit that stores, in a storage unit, device identification information for identifying the electric device in association with outlet identification information on an outlet to which the electric device is determined to be connected and the tap identification information that is received together with the outlet identification information.

Further, a device registration method according to the present invention is performed by a device registration apparatus that communicates with an electric device and a power feed tap that measures, with respect to each of outlets to which the electric device is to be connected, an electric power that is fed to the electric device from the outlet, the device registration method comprising: transmitting, to the electric device, a state shift command for shifting the electric device to a specific state; receiving, from the power feed tap, tap identification information for identifying the power feed tap, electric-power information that indicates an electric power that is measured at each of the outlets, and outlet identification information for identifying an outlet that corresponds to each piece of the electric-power information; determining, when, in the electric-power information that is on each of the outlets and that is received from the power feed tap during a predetermined time period after the state shift command is transmitted, electric-power information of only one outlet indicates a change in an electric power when the electric device shifts to the specific state, that the electric device is connected to the outlet that corresponds to the electric-power information; and storing, in a storage unit, device identification information for identifying the electric device in association with outlet identification information on an outlet to which the electric device is determined to be connected and the tap identification information that is received together with the outlet identification information.

BRIEF DESCRIPTION OF DRAWINGS

FIG. 6B is a flowchart that illustrates an example of operation performed by the control server apparatus according to the embodiment to associate the electric device with an outlet of the power feed tap.

DESCRIPTION OF EMBODIMENTS

A detailed explanation is given below, with reference to the drawings, of an embodiment of a device registration apparatus and a device registration method according to the present invention. The present invention is not limited to the following embodiment, and the alternatives that are easily arrived at by a person skilled in the art, the alternatives that are substantially the same, and the ones in the scope of what are called equivalents may be included with respect to the components of the following embodiment. Furthermore, various omissions, replacements, and changes may be made to the components without departing from the scope of the following embodiment.

Embodiment

Overall Configuration of Device Registration System

Figure 1:
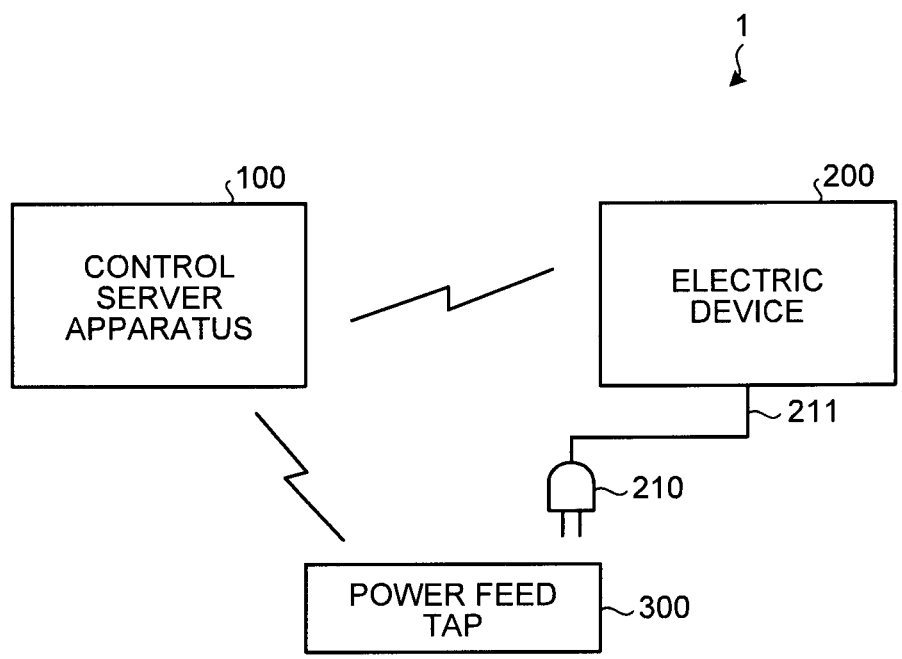
FIG. 1 is a diagram that illustrates an example of the overall configuration of a device registration system according to an embodiment.

FIG. 1 is a diagram that illustrates an example of the overall configuration of a device registration system 1 according to the present embodiment. With reference to FIG. 1, an explanation is given of a configuration of the device registration system 1 according to the present embodiment.

Figure 4:
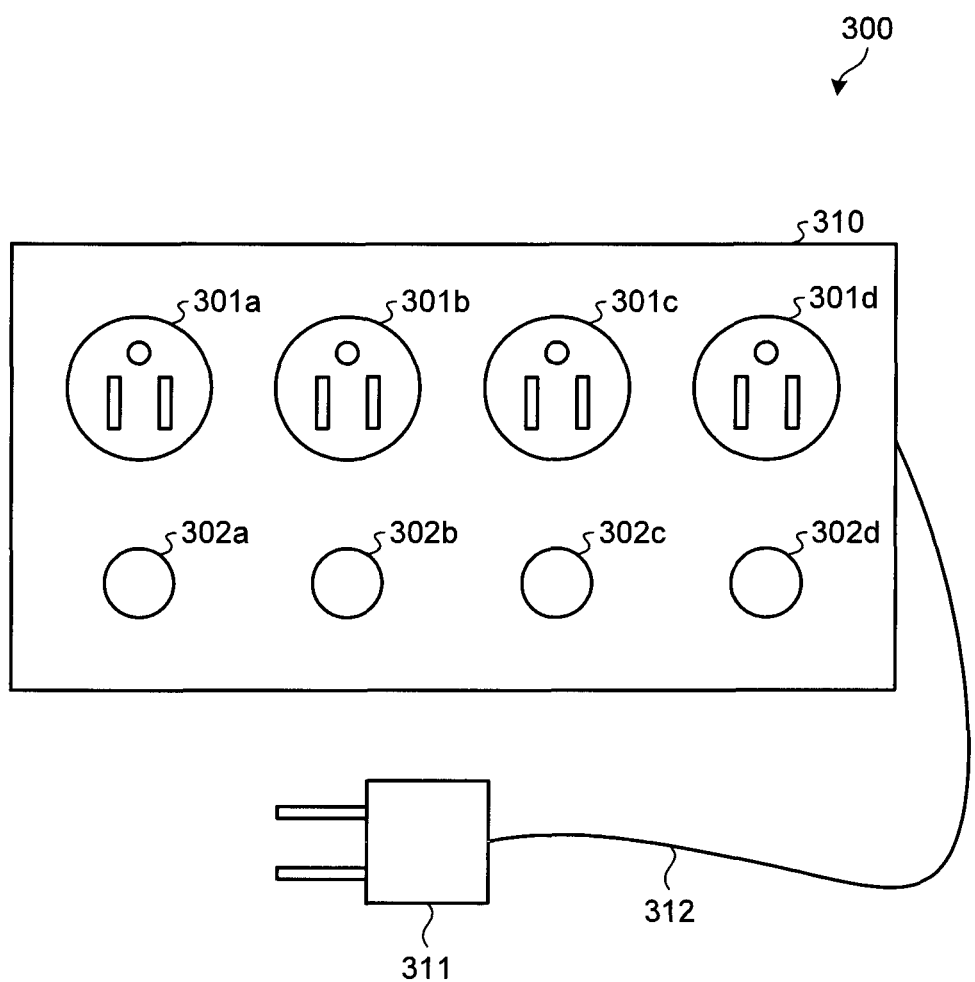
FIG. 4 is an external view of a power feed tap according to the embodiment.

As illustrated in FIG. 1, the device registration system 1 according to the present embodiment includes a control server apparatus 100 that is a device registration apparatus; an electric device 200; and a power feed tap 300. The control server apparatus 100 and the electric device 200 communicate information to each other by using a wireless communication system, for example, Wi-Fi (Wireless Fidelity) (registered trademark). Furthermore, the control server apparatus 100 and the power feed tap 300 communicate information to each other by using a wireless communication system, for example, Wi-Fi. The electric device 200 receives the electric power that is fed from the power feed tap 300. Specifically, when a power plug 210 is inserted into an outlet (outlets 301a to 301d that are illustrated in FIG. 4 and are explained later) that is formed on the power feed tap 300, the electric device 200 receives the electric power that is fed via the power plug 210 and a cord 211.

Although the single electric device 200 and the single power feed tap 300 are illustrated in FIG. 1, any number of the power feed taps 300 may be included in the device registration system 1, and any number of the electric devices 200 may be connected to the single power feed tap 300. The device registration system 1 according to the present embodiment assumes an automatic registration of the electric device 200 that is used in an office, for example, and actually it includes a large number of the power feed taps 300 and a large number of the electric devices 200.

Furthermore, the communication between the control server apparatus 100 and the electric device 200 and the communication between the control server apparatus 100 and the power feed tap 300 are not limited to Wi-Fi. For example, other wireless communication systems may be used, or a communication using an Ethernet (registered trademark) cable or a wired communication system, such as PLC (Power Line Communication), may be used.

Configuration of Control Server Apparatus

Figure 2:
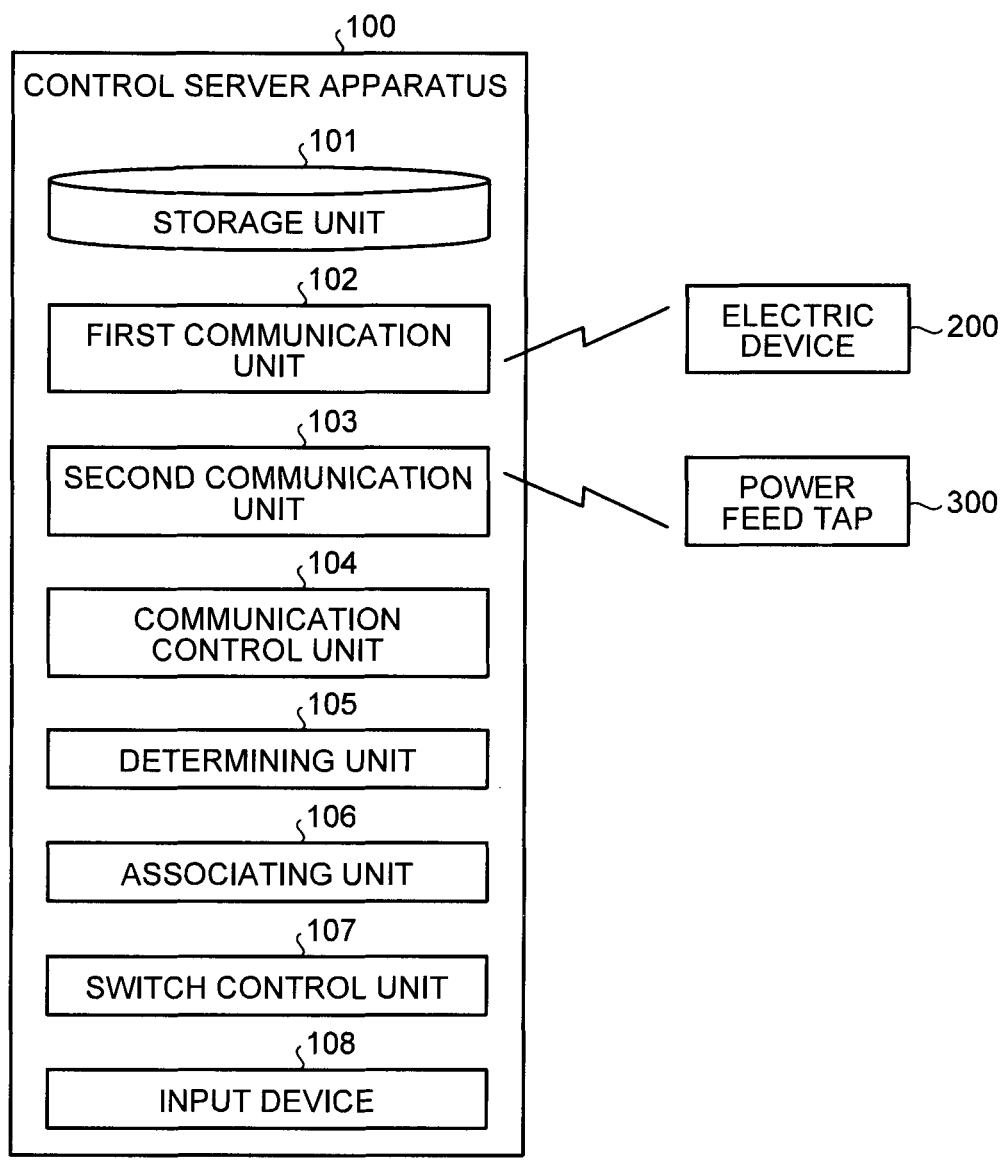
FIG. 2 is a block diagram that illustrates an example of the configuration of a control server apparatus according to the embodiment.

FIG. 2 is a block diagram that illustrates an example of the configuration of the control server apparatus 100 according to the present embodiment. With reference to FIG. 2, an explanation is given of the block configuration of the control server apparatus 100 according to the present embodiment.

As illustrated in FIG. 2, the control server apparatus 100 includes a storage unit 101, a first communication unit 102, a second communication unit 103, a communication control unit 104, a determining unit 105, an associating unit 106, a switch control unit 107, and an input device 108.

The storage unit 101 stores information, such as a device registration table Ta that will be explained later, that is required to perform a device registration operation. The storage unit 101 is implemented by using a storage device, for example, an HDD (Hard Disk Drive), SSD (Solid State Drive), optical disk, or MO (Magneto-Optical Disk).

The first communication unit 102 performs communication with each electric device 200 included in the device registration system 1. Specifically, the first communication unit 102 transmits, to the electric device 200, a device-information requirement command that causes the electric device 200 to transmit device information. The first communication unit 102 receives the device information that is transmitted from the electric device 200 in accordance with the device-information requirement command. After the device information is received by the first communication unit 102 from the electric device 200, it is sent to the associating unit 103 by the communication control unit 104. The device information is information, such as a device name, that indicates the type of the electric device 200, and it is stored in a storage unit 201, which will be explained later, of the electric device 200.

Furthermore, the first communication unit 102 transmits, to the electric device 200, a state shift command to make the electric device 200 shift to a specific state. Here, the shift to a specific state includes, for example, a shift from a sleep state to a wake-up state, a shift from a wake-up state to a sleep state, a shift from a power-on state (a wake-up state or a sleep state) to a power-off state (a shut-down state), or a shift from a power-off state to a power-on state. The present embodiment assumes that it is previously determined which one of the states the electric device 200 is to be shifted in accordance with the assumed type of the electric device 200.

The second communication unit 103 performs communication with each of the power feed taps 300 that are included in the device registration system 1. Specifically, the second communication unit 103 receives, from the power feed tap 300 regularly at a predetermined time interval, the tap ID for identifying the power feed tap 300, the electric-power information that indicates the electric power that is measured at each of the outlets of the power feed tap 300, and the outlet information (the number allocated to each of the outlets, or the like) for identifying the outlet that corresponds to each piece of the electric-power information. After the tap ID, the electric-power information, and the outlet information are received by the second communication unit 103 from the power feed tap 300, they are sent to the determining unit 105, or the like, by the communication control unit 104. A configuration may be employed in which the tap ID, the electric-power information, and the outlet information are received irregularly from the power feed tap 300. In this case, the second communication unit 103 requests each of the power feed taps 300 included in the device registration system 1 to transmit the electric-power information in accordance with, for example, some kind of trigger that is generated within the control server apparatus 100, and it receives the tap ID, the electric-power information, and the outlet information that are transmitted from each of the power feed taps 300 in accordance with the request.

Furthermore, if necessary, the second communication unit 103 transmits, to the power feed tap 300, a control signal to control an ON/OFF operation of a switch (first switches 320a to 320d that are explained later with reference to FIG. 5) of the power feed tap 300.

The communication control unit 104 controls communication of information with the electric device 200 via the first communication unit 102 and communication of information with the power feed tap 300 via the second communication unit 103.

The determining unit 105 uses the electric-power information of the electric device 200 that is received by the second communication unit 103 from the power feed tap 300 to determine which one of the outlets of which one of the power feed taps 300 included in the device registration system 1 is connected to the electric device 200 that is a transmission destination to which the first communication unit 102 has transmitted a state shift command. Specifically, if, in the electric-power information of each outlet that is received by the second communication unit 103 within a predetermined time period after the first communication unit 102 transmits a state shift command to the electric device 200, electric-power information of only one outlet indicates a change in the electric power when the electric device 200 shifts to a specific state, the determining unit 105 determines that the electric device 200, which is a transmission destination of the state shift command, is connected to the outlet that corresponds to the electric-power information. A change in the electric power when the electric device 200 shifts to a specific state can be predicted depending on each pattern of the above-described state shift. For example, if a rule for a threshold determination with respect to an electric power value, or the like, is previously defined, it is possible to determine whether the electric-power information received from the power feed tap 300 indicates a change in the electric power when the electric device 200 shifts to a specific state.

If the determining unit 105 uniquely identifies which one of the outlets of which one of the power feed taps 300 is connected to the electric device 200 that is a transmission destination of the state shift command, the associating unit 106 associates, among the device IDs that identify the electric devices 200 and that are previously stored in the device registration table Ta, which will be explained later, the device ID of the electric device 200 that is a transmission destination of the state shift command, with the outlet information on the outlet to which the electric device 200 is determined to be connected, and the tap ID of the power feed tap 300, and registers them in the device registration table Ta.

If the determining unit 105 does not uniquely identify which one of the outlets of which one of the power feed taps 300 is connected to the electric device 200 that is a transmission destination of the state shift command, the first communication unit 102 then transmits a state shift command to the electric device 200 again at any timing. Specifically, if electric-power information of none of the outlets that is received by the second communication unit 103 during a predetermined time period after the first communication unit 102 transmits a state shift command to the electric device 200 indicate a change in the electric power when the electric device 200 shifts to a specific state, or if electric-power information of outlets indicates a change in the electric power when the electric device 200 shifts to a specific state, the determining unit 105 cannot uniquely identify which one of the outlets of which one of the power feed taps 300 is connected to the electric device 200 that is a transmission destination of the state shift command. In this case, the first communication unit 102 transmits a state shift command to the electric device 200 again, and the determining unit 105 repeats the above-described operation.

Furthermore, when the first communication unit 102 receives the device information (the device name, or the like) that is transmitted from the electric device 200 in accordance with the device-information requirement command, the associating unit 106 registers the device information in the device registration table Ta, which will be explained later, in association with the device ID of the electric device 200 that is a transmission destination of the device-information requirement command among the device IDs that are previously stored in the device registration table Ta and that identify the electric device 200.

The switch control unit 107 generates a control signal for controlling an ON/OFF operation of a switch of the power feed tap 300 and transmits it to the power feed tap 300 via the communication control unit 104 and the second communication unit 103, thereby remotely controlling a start or shutoff of an electric power supply to the electric device 200 that is connected to an outlet of the power feed tap 300.

The input device 108 is a device by which a user inputs various types of information to the control server apparatus 100. The input device 108 is implemented by using, for example, a keyboard, a touch panel, a pointing device, such as a mouse, or a sound input device.

The above-described communication control unit 104, the determining unit 105, the associating unit 106, and the switch control unit 107 are implemented by using, for example, a CPU (Central Processing Unit), an ASIC (Application Specific Integrated Circuit), and/or the like.

Configuration of Electric Device

Figure 3:
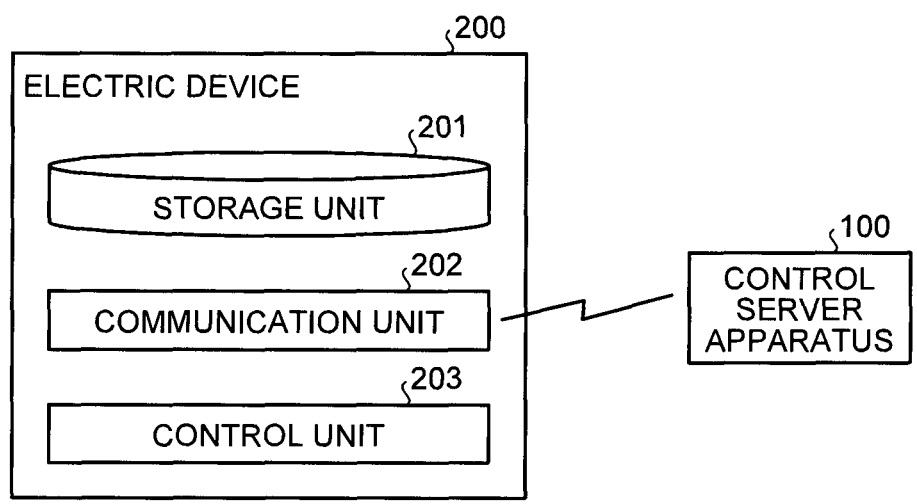
FIG. 3 is a block diagram that illustrates an example of the configuration of an electric device according to the embodiment.

FIG. 3 is a block diagram that illustrates an example of the configuration of the electric device 200 according to the present embodiment. With reference to FIG. 3, an explanation is given of the block configuration of the electric device 200 according to the present embodiment.

As illustrated in FIG. 3, the electric device 200 includes the storage unit 201, a communication unit 202, and a control unit 203.

The storage unit 201 stores the device ID that is previously assigned to the electric device 200. The device ID is, for example, a MAC (Media Access Control) address or an IP (Internet Protocol) address. Furthermore, the storage unit 201 stores device information, such as a device name. Device information, such as a device name, is input by a user of the electric device 200, for example, and is stored in the storage unit 201. The storage unit 201 is implemented by using a storage device, such as an HDD (Hard Disk Drive) or SSD (Solid State Drive).

The communication unit 202 performs communication with the control server apparatus 100. Specifically, the communication unit 202 receives the above-described device-information requirement command from the control server apparatus 100 and sends it to the control unit 203. The communication unit 202 then transmits, to the control server apparatus 100, the device information that is read by the control unit 203 from the storage unit 201 in accordance with the device-information requirement command. Furthermore, the communication unit 202 receives the above-described state shift command from the control server apparatus 100 and sends it to the control unit 203.

The control unit 203 is a unit that controls operation of each unit of the electric device 200. According to the present embodiment, particularly, the control unit 203 has a capability to read the device information from the storage unit 201 in accordance with the device-information requirement command from the control server apparatus 100 and to transmit the device information to the control server apparatus 100 via the communication unit 202. Furthermore, the control unit 203 has a capability to shift the electric device 200 to a specific state in accordance with a state shift command from the control server apparatus 100. The control unit 203 is implemented by using, for example, a CPU, an ASIC and/or the like.

Configuration of Power Feed Tap

FIG. 4 is an external view of the power feed tap 300 according to the present embodiment. FIG. 5 is a block diagram that illustrates an example of the functional configuration of the power feed tap 300 according to the present embodiment. With reference to FIGS. 4 and 5, an explanation is given of a configuration of the power feed tap 300 according to the present embodiment.

As illustrated in FIG. 4, the power feed tap 300 includes a tap main body 310 and a power plug 311 that is inserted into an outlet of the commercial power source. The power plug 311 is connected to the tap main body 310 via a cord 312.

The tap main body 310 includes the outlets 301a to 301d (hereafter, simply referred to as the outlet 301 when any one of them is referred to or when they are collectively referred to). Furthermore, the tap main body 310 includes operation buttons 302a to 302d (hereafter, simply referred to as the operation button 302 when any one of them is referred to or when they are collectively referred to) that correspond to the outlets 301a to 301d, respectively, and that are operated and pressed by a user.

As illustrated in FIG. 4, the tap main body 310 includes the four outlets 301a to 301d; however, this is not a limitation, and the number of the outlets 301 may be arbitrary. Furthermore, as illustrated in FIG. 4, the tap main body 310 includes the four operation buttons 302a to 302d that correspond to the four outlets 301a to 301d; however, this is not a limitation. Specifically, it is appropriate if the number of the operation buttons 302 corresponds to the number of the outlets 301.

When the power plug 210 of the electric device 200 is inserted into the outlet 301, a power is supplied to the electric device 200.

As described later, the operation button 302 is a button for switching between power feeding and shutoff of power feeding to the electric device 200 that is connected to the outlet 301 that is in a state where it can supply power, in accordance with a control signal from the control server apparatus 100. A user performs an operation to press the operation button 302 that corresponds to the outlet 301 that is in a state where it can supply power, whereby it is possible to switch between power feeding and shutoff of power feeding to the electric device 200 that is connected to the outlet 301.

Furthermore, it is preferable that the operation button 302 is configured to include a display unit that notifies a user of the status of the corresponding outlet 301. For example, the operation button 302 includes, as the display unit, a built-in LED, or the like; thus, if the light-emitting state of the LED is changed in accordance with the status of the corresponding outlet 301, the status can be recognized by the user.

Specifically, as described later, if the outlet 301 is in a state where it cannot supply power in accordance with a control signal from the control server apparatus 100, for example, the light of the display unit of the operation button 302 is turned off. Furthermore, if the outlet 301 does not actually supply power although it is in a state where it can supply power in accordance with a control signal from the control server apparatus 100, the orange light of the display unit of the operation button 302 is turned on. Moreover, if the outlet 301 is in a state where it can supply power, the power plug 210 of the electric device 200 is connected to the outlet 301, and power is actually supplied to the electric device 200, the green light of the display unit of the operation button 302 is turned on. This allows a user to easily recognize the status of the outlet 301. A method for notifying a user of the power supplying status of the outlet 301 is not limited to the above-described method and, for example, the power supplying status of the outlet 301 may be notified by using not only an operation to turn on/off the light of the operation button 302 but also a flickering state thereof.

Figure 5:
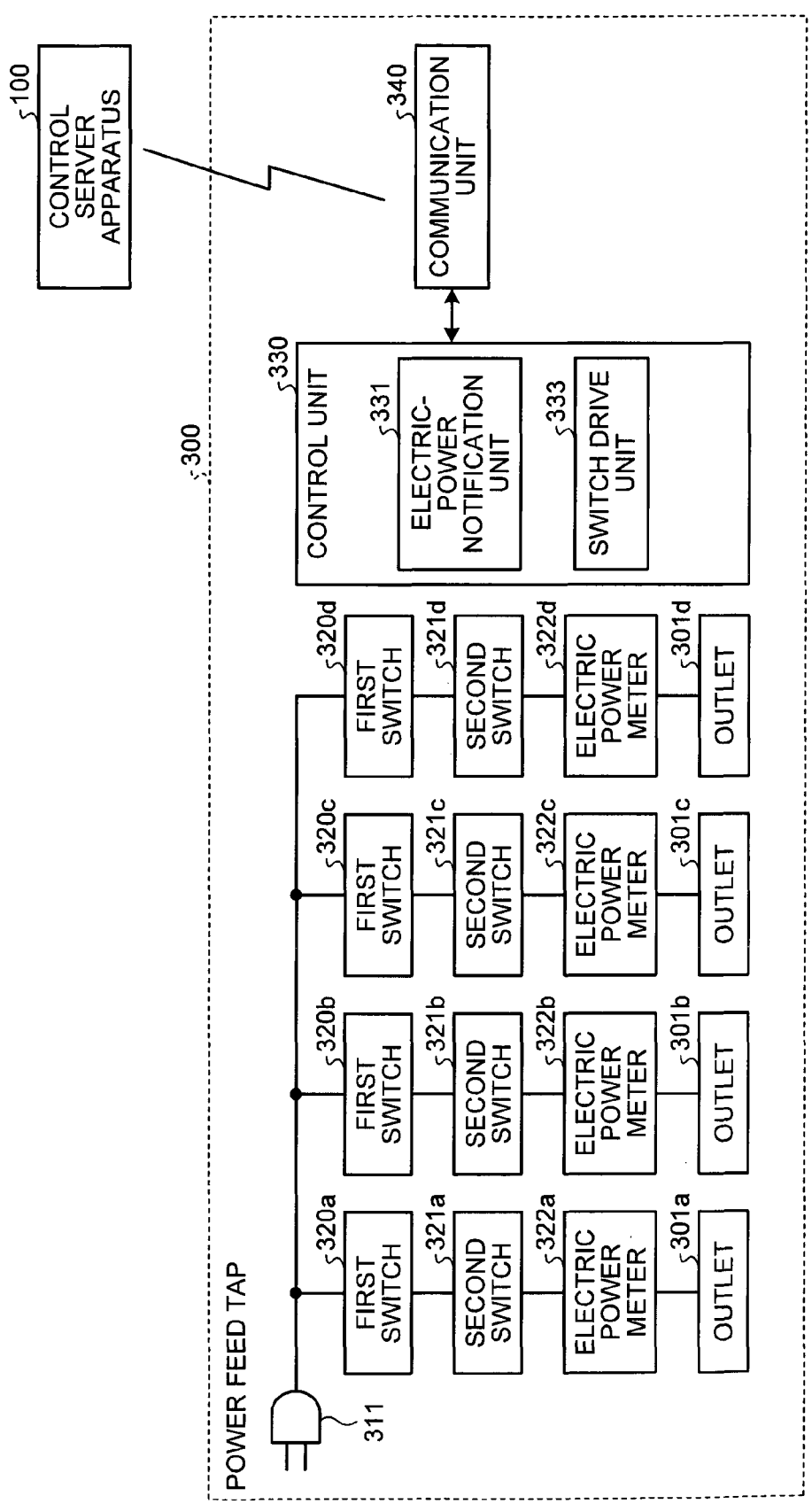
FIG. 5 is a block diagram that illustrates an example of the functional configuration of the power feed tap according to the embodiment.

FIG. 5 illustrates a block configuration inside the power feed tap 300. As illustrated in FIG. 5, the power feed tap 300 includes, corresponding to the above-described outlets 301a to 301d, the first switches 320a to 320d (hereafter, simply referred to as a first switch 320 when any one of them is referred to or when they are collectively referred to), second switches 321a to 321d (hereafter, simply referred to as a second switch 321 when any one of them is referred to or when they are collectively referred to), and electric power meters 322a to 322d (hereafter, simply referred to as an electric power meter 322 when any one of them is referred to or when they are collectively referred to). Furthermore, the power feed tap 300 includes a control unit 330 and a communication unit 340.

The first switch 320 is a switching device that is operated to turn ON/OFF by a switch drive unit 333 of the control unit 330, which will be explained later, in accordance with a control signal from the control server apparatus 100. As described above, to set the corresponding outlet 301 in a state where it can supply power, the first switch 320 enters the ON state (shorted state) in accordance with a control signal from the control server apparatus 100. Furthermore, to set the corresponding outlet 301 in a state where it cannot supply power, the first switch 320 enters the OFF state (open state) in accordance with a control signal from the control server apparatus 100.

The second switch 321 is a switching device that is operated to turn ON/OFF in accordance with a user's pressing operation of the operation button 302. If both the corresponding first switch 320 and the corresponding second switch 321 are in the ON state, the outlet 301 supplies power to the electric device 200 that is connected to the outlet 301. If the second switch 321 is in the OFF state although the first switch 320 is in the ON state, a power supply from the corresponding outlet 301 to the electric device 200 is shut off.

When the electric device 200 is connected to the corresponding outlet 301 and is supplied with power, the electric power meter 322 measures the electric power that is fed from the outlet 301 to the electric device 200.

The control unit 330 is a unit that controls operation of each unit of the power feed tap 300. The control unit 330 is implemented by using, for example, a CPU, an ASIC, and/or the like. The control unit 330 includes an electric-power notification unit 331 and the switch drive unit 333.

The electric-power notification unit 331 causes the communication unit 340 to transmit, to the control server apparatus 100 regularly at a predetermined time interval or in accordance with a request from the control server apparatus 100, the electric-power information that indicates the electric power measured by the electric power meter 322 together with the tap ID and the outlet information on the corresponding one of the outlets 301 for each of the outlets 301. The control server apparatus 100 is capable of determining which one of the power feed taps 300 each piece of the electric-power information has come from by using the tap ID that is transmitted from the power feed tap 300 together with the corresponding pieces of the electric-power information and is capable of determining which one of the outlets 301 each piece of the electric-power information has been measured at by using the outlet information that is transmitted together with the corresponding piece of the electric-power information.

The switch drive unit 333 performs an operation to turn ON/OFF the first switch 320 in accordance with a control signal received from the control server apparatus 100. Furthermore, if the electric power meter 322 detects an abnormal electric power value, the switch drive unit 333 may perform an operation to turn OFF the first switch 320 that corresponds to the electric power meter 322 regardless of a control signal.

The communication unit 340 performs communication with the control server apparatus 100. Specifically, the communication unit 340 transmits, to the control server apparatus 100, the electric-power information on each of the above-described outlets 301 together with the tap ID and the outlet information on each of the outlets 301 under the control of the electric-power notification unit 331. Furthermore, the communication unit 340 receives, from the control server apparatus 100, a control signal for controlling an ON/OFF operation of the first switch 320.

Operation of Device Registration System

Figure 6A:
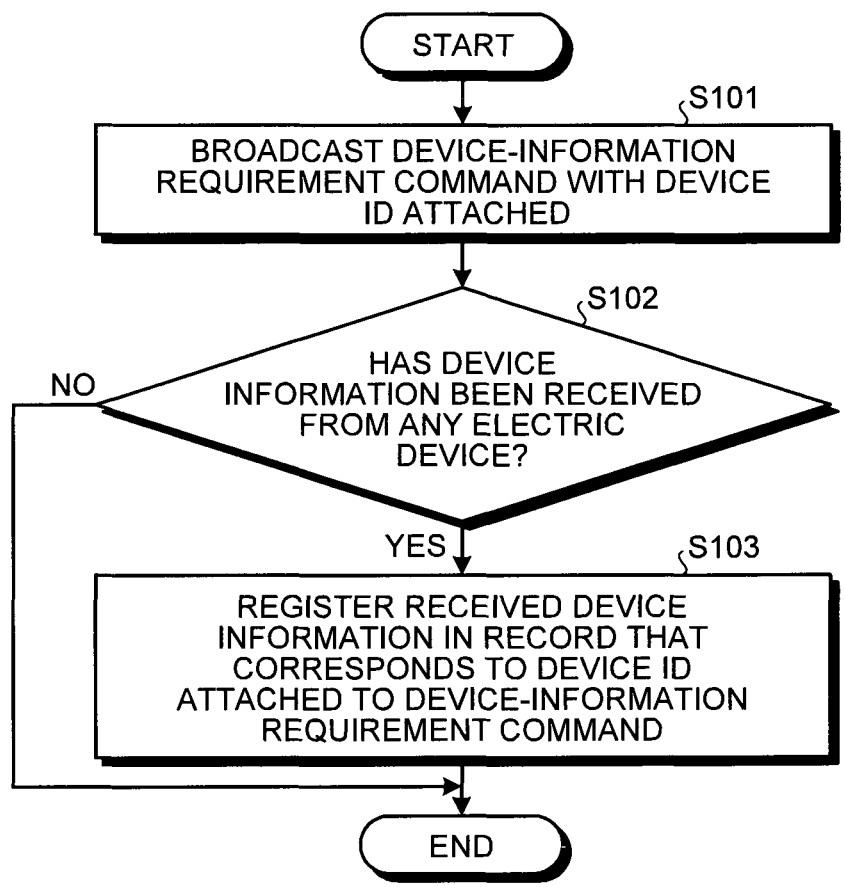
FIG. 6A is a flowchart that illustrates an example of a device-information registration operation performed by the control server apparatus according to the embodiment.
Figures 7, 8:
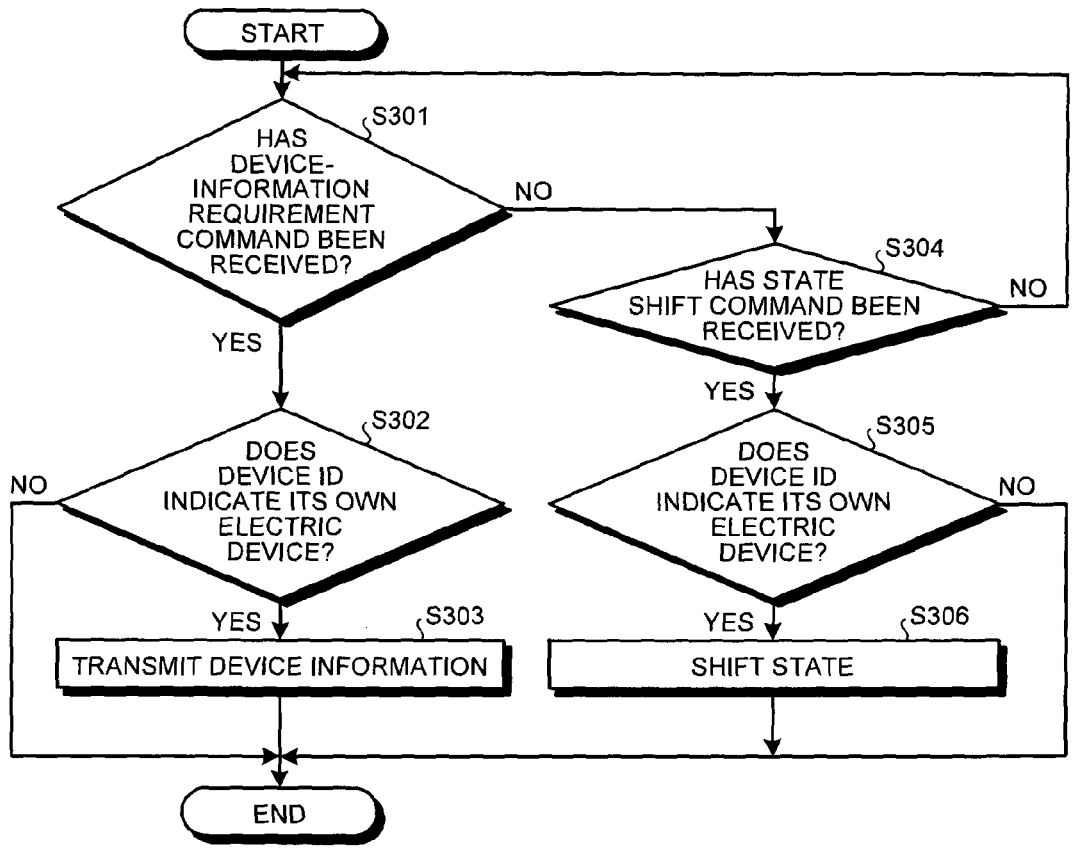
FIG. 7 is a flowchart that illustrates an example of operation of the electric device according to the embodiment.
FIG. 8 is a table that illustrates an example of the structure of a device registration table that is stored in the control server apparatus according to the embodiment.

FIG. 6A is a flowchart that illustrates an example of a device-information registration operation performed by the control server apparatus 100 according to the present embodiment, and FIG. 6B is a flowchart that illustrates an example of operation performed by the control server apparatus 100 according to the present embodiment to associate the electric device 200 with the outlet 301 of the power feed tap 300. FIG. 7 is a flowchart that illustrates an example of operation of the electric device 200 according to the present embodiment. FIG. 8 is a table that illustrates an example of the structure of the device registration table Ta that is stored in the storage unit 101 of the control server apparatus 100 according to the present embodiment.

First, an explanation is given, with reference to FIGS. 6A and 8, of the device-information registration operation by principally focusing on operation of the control server apparatus 100. According to the present embodiment, it is assumed that the device ID (MAC address, or the like) of each electric device 200 for which device information thereof is to be registered in the control server apparatus 100 is previously registered in the device registration table Ta of the control server apparatus 100.

Step S101

The first communication unit 102 of the control server apparatus 100 broadcasts, to all the electric devices 200 within the device registration system 1, the device-information requirement command with the device ID attached, such as the MAC address that is registered in the device registration table Ta, for example, under the control of the communication control unit 104. If each electric device 200 within the device registration system 1 receives the device-information requirement command from the control server apparatus 100 and if the device ID, such as the MAC address, that is attached to the received device-information requirement command indicates its own electric device, it transmits, to the control server apparatus 100, the device information, such as the device name, that is stored in the storage unit 201 as a reply for the received device-information requirement command.

Step S102

The communication control unit 104 determines whether the first communication unit 102 has received device information from any of the electric devices 200. If the first communication unit 102 has received device information from any of the electric devices 200 (Step S102: Yes), the communication control unit 104 sends, to the associating unit 106, the device information received by the first communication unit 102 and proceeds to Step S103 or, if the first communication unit 102 has not received device information (Step S102: No), the process is terminated.

Step S103

The associating unit 106 registers the device information received by the first communication unit 102 from the electric device 200 in the record that is in the device registration table Ta illustrated in FIG. 8 and that corresponds to the device ID attached to the device-information requirement command at Step S101. For example, as in the device registration table Ta illustrated in FIG. 8, if the device information "PC" is received as a reply for the device-information requirement command to which the device ID "ABCD" is attached, the associating unit 106 registers the device information "PC" in the record that corresponds to the device ID "ABCD".

Next, an explanation is given, with reference to FIGS. 6B and 8, of an operation to associate the electric device 200 with the outlet 301 of the power feed tap 300 by principally focusing on operation of the control server apparatus 100. According to the present embodiment, it is assumed that, separately from the operation illustrated in the flowchart of FIG. 6B, the control server apparatus 100 receives, from each of the power feed taps 300 in the device registration system 1 regularly at a predetermined time interval, the tap ID, the electric-power information on each of the outlets 301, and the outlet information on the outlet 301 that corresponds to each piece of the electric-power information.

Step S201

The first communication unit 102 of the control server apparatus 100 broadcasts, to all the electric devices 200 in the device registration system 1, a state shift command with the device ID attached, such as the MAC address that is registered in the device registration table Ta, for example, under the control of the communication control unit 104. Each electric device 200 in the device registration system 1 receives a state shift command from the control server apparatus 100 and, if the device ID, such as the MAC address, attached to the received state shift command indicates its own electric device, it shifts to a specific state in accordance with the received state shift command. When the electric device 200 shifts to a specific state, a change occurs in the electric power that is fed to the electric device 200 from the tap outlet 301 of the power feed tap 300 that is connected to the electric device 200.

Step S202

The determining unit 105 determines whether the second communication unit 103 has received, from any of the power feed taps 300, the electric-power information that indicates a change in the electric power when the electric device 200 shifts to a specific state during a predetermined time period after the broadcast of the state shift command at Step S201. Specifically, the determining unit 105 refers to the electric-power information on each of the outlets 301 that is received by the second communication unit 103 from each of the power feed taps 300 in the device registration system 1 during a predetermined time period after the first communication unit 102 broadcasts the state shift command at Step S201 so as to determine whether the electric-power information includes electric-power information that indicates a pattern of an electric power change that corresponds to the state shift command broadcasted at Step S201. If the electric-power information that indicates the above pattern of the electric power change is included (Step S202: Yes), the process proceeds to Step S203 and, if it is not included (Step S202: No), the process is terminated.

Step S203

The determining unit 105 determines whether electric-power information of only one outlet that is received by the second communication unit 103 from any one of the power feed taps 300 indicates a change in the electric power when the electric device 200 shifts to a specific state. If such electric-power information has been received for only one outlet (Step S203: Yes), the outlet information on the outlet 301 that corresponds to the electric-power information and the tap ID that is received from the power feed tap 300 together with the electric-power information are sent to the associating unit 106, and the process proceeds to Step S204 and, if the multiple pieces of electric-power information have been received (Step S203: No), the process is terminated.

Step S204

The associating unit 106 registers the tap ID and the outlet information sent from the determining unit 105 in the record that is in the device registration table Ta illustrated in FIG. 8 and that corresponds to the device ID that is attached to the state shift command at Step S201. For example, as in the device registration table Ta illustrated in FIG. 8, if the state shift command with the device ID "ABCD" attached is broadcasted and, if the tap ID "AA" and the outlet information "2" are sent from the determining unit 105, the associating unit 106 registers the tap ID "AA" and the outlet information "2" in the record that corresponds to the device ID "ABCD".

The control server apparatus 100 according to the present embodiment repeats the above operation on all the electric devices 200 included in the device registration system 1 as targets until the power feed taps 300 and the outlets 301 to which the electric devices 200 are connected are uniquely identified, whereby all the electric devices 200 are automatically registered in the device registration table Ta. After the control server apparatus 100 performs the above registration operation, it refers to the device registration table Ta so as to determine which one of the electric devices 200 is connected to which one of the outlets 301 of which one of the power feed taps 300. For example, based on the top record of the device registration table Ta illustrated in FIG. 8, it is determined that the electric device 200 (the device information "PC") identified by using the device ID "ABCD" is connected to the outlet 301 that is identified by using the outlet information "2" in the power feed tap 300 that is identified by using the tap ID "AA". Furthermore, based on the second record of the device registration table Ta illustrated in FIG. 8, it is determined that the electric device 200 (the device information "MFP") identified by using the device ID "BODE" is connected to the outlet 301 that is identified by using the outlet information "3" in the power feed tap 300 that is identified by using the tap ID "BC". Moreover, based on the third record of the device registration table Ta illustrated in FIG. 8, it is determined that the electric device 200 (the device information "projector") identified by using the device ID "CDEF" is connected to the outlet 301 that is identified by using the outlet information "1" in the power feed tap 300 that is identified by using the tap ID "EF".

After the automatic registration of all the electric devices 200 in the device registration table Ta is completed, the control server apparatus 100 performs the sequence of operations illustrated in FIG. 6B on a regular basis; thus, if the association relationship among the electric device 200, the power feed tap 300, and the outlet 301 is different from that stored in the device registration table Ta, the device registration table Ta is preferably updated. Thus, if the electric device 200 is moved to be connected to the different power feed tap 300 or the different outlet 301, it is automatically determined which one of the power feed taps 300 or the outlets 301 the electric device 200 is newly connected to, whereby the device registration table Ta can keep the information up-to-date.

Next, an explanation is given, with reference to FIG. 7, of operation by principally focusing on operation of the electric device 200.

Step S301

The control unit 203 of the electric device 200 determines whether the communication unit 202 has received a device-information requirement command from the control server apparatus 100 (Step S301). If a device-information requirement command has been received (Step S301: Yes), the process proceeds to Step S302 and, if not (Step S301: No), the process proceeds to Step S304.

Step S302

The control unit 203 determines whether the device ID (MAC address, or the like) attached to the device-information requirement command received from the control server apparatus 100 indicates its own electric device. If the device ID indicates its own electric device (Step S302: Yes), the process proceeds to Step S303 and, if not (Step S302: No), the process is terminated.

Step S303

The control unit 203 reads the device information, such as the device name, from the storage unit 201 and transmits it to the control server apparatus 100 via the communication unit 202, and the process is terminated.

Step S304

The control unit 203 determines whether the communication unit 202 has received a state shift command from the control server apparatus 100 (Step S304). If a state shift command has been received (Step S304: Yes), the process proceeds to Step S305 and, if not (Step S304: No), the process returns to Step S301.

Step S305

The control unit 203 determines whether the device ID (MAC address, or the like) attached to the state shift command received from the control server apparatus 100 indicates its own electric device. If the device ID indicates its own electric device (Step S305: Yes), the process proceeds to Step S306 and, if not (Step S305: No), the process is terminated.

Step S306

The control unit 203 causes the electric device 200 to shift to a specific power state in accordance with the state shift command received from the control server apparatus 100. Then, the process is terminated.

As described above, the control server apparatus 100 according to the present embodiment causes the electric device 200 to shift to a specific state, receives the electric-power information on each of the outlets 301 from the power feed tap 300 and, if electric-power information of only one outlet indicates a change in the electric power when the electric device 200 shifts to a specific state, determines that the electric device 200 having been shifted to the specific state is connected to the outlet 301 of the power feed tap 300 that corresponds to the electric-power information. The device ID of the electric device 200 is registered in the device registration table Ta in association with the tap ID for identifying the power feed tap 300 and the outlet information for identifying the outlet 301. Furthermore, the control server apparatus 100 according to the present embodiment receives the device information, such as the device name, from the electric device 200, registers, in the device registration table Ta, the device ID of the electric device 200 in association with the device information, such as the device name, from the electric device 200. Thus, with the control server apparatus 100 according to the present embodiment, the association relationship among the power feed tap 300, the outlet 301, and the electric device 200 that is connected to the outlet 301 can be automatically registered.

Furthermore, the control server apparatus 100 according to the present embodiment transmits, to the electric device 200, a device-information requirement command or a state shift command with a device ID attached thereto, such as a MAC address that is previously registered in the device registration table Ta. This allows the electric device 200 to determine whether a command from the control server apparatus 100 is a command for its own electric device by using the device ID as a key, whereby a control can be performed efficiently. Furthermore, the control server apparatus 100 according to the present embodiment regularly performs an operation to associate the electric device 200 with the outlet 301 of the power feed tap 300; therefore, if the electric device 200 is moved to be connected to the different power feed tap 300 or the different outlet 301, it is automatically determined which one of the power feed taps 300 or the outlets 301 the electric device 200 is newly connected to, whereby the device registration table Ta can keep the information up-to-date.

In the above-described example, it is assumed that the device ID, such as the MAC address, of the electric device 200 is previously registered in the device registration table Ta; however, it may be acquired from the electric device 200 before the control server apparatus 100 transmits a device-information requirement command or a state shift command to the electric device 200. For example, a configuration may be employed in which, when the electric device 200 first communicates with the control server apparatus 100, the MAC address, or the like, stored in the storage unit 201 is transmitted as the device ID to the control server apparatus 100.

Furthermore, a state shift command that is transmitted by the control server apparatus 100 to the electric device 200 may be code information that is shared by the control server apparatus 100 and the electric device 200. In this case, for example, the storage unit 201 of the electric device 200 previously stores the code information that indicates a state shift command for shifting its own electric device 200 to a specific state. For example, when the electric device 200 first communicates with the control server apparatus 100, the code information stored in the storage unit 201 is transmitted to the control server apparatus 100. The control server apparatus 100 stores, in the storage unit 101, the code information received from the electric device 200 in association with the device ID, such as the MAC address, of the electric device 200. When the control server apparatus 100 transmits a state shift command to the electric device 200, it reads, from the storage unit 101, the code information that is stored in association with the device ID of the electric device 200 and transmits the code information as a state shift command. Thus, it is possible to reduce the loads when a state shift command is transmitted from the control server apparatus 100 to the electric device 200 and to perform a communication effectively.

Hardware Configuration

An explanation is given of the hardware configuration of the control server apparatus 100 (device registration apparatus) according to the above-described embodiment. The control server apparatus 100 according to the above-described embodiment can be implemented by using the hardware configuration of a typical computer system that includes a control device, such as a CPU, a storage device, such as a ROM (Read Only Memory) and a RAM (Random Access Memory), an external storage device, such as an HDD or SSD, a display device, such as a display, an input device, such as a mouse and a keyboard, and a communication device, such as an NIC (Network Interface Card). The control server apparatus 100 can implement each of the above-described functional units by, for example, executing a predetermined program with the CPU while using the RAM as a work area.

The program to be executed by the control server apparatus 100 according to the above-described embodiment is provided by being stored, in the form of a file that is installable or executable, in a readable storage medium, such as a CD-ROM, CD-R, memory card, DVD (Digital Versatile Disk), or flexible disk (FD).

Furthermore, the program to be executed by the control server apparatus 100 according to the above-described embodiment may be stored in a computer connected via a network, such as the Internet, and be provided by being downloaded via the network. Furthermore, the program to be executed by the control server apparatus 100 according to the above-described embodiment may be provided or distributed via a network, such as the Internet. Moreover, the program to be executed by the control server apparatus 100 according to the above-described embodiment may be provided by being previously installed in a ROM, or the like.

The program to be executed by the control server apparatus 100 according to the above-described embodiment has a modular configuration for implementing each of the above-described units (the first communication unit 102, the second communication unit 103, the communication control unit 104, the determining unit 105, the associating unit 106, and the switch control unit 107) on a computer. As for the actual hardware, a control device, such as a CPU, reads the program from an external storage device into a storage device and executes it so as to implement each of the above-described processing units on the computer.

Moreover, each electric device 200 and the power feed tap 300 according to the above-described embodiment includes a control device, such as a CPU, and performs a predetermined program by using the control device so as to implement each of the above-described units. The program to be executed by the electric device 200 or the power feed tap 300 according to the above-described embodiment is provided by being previously installed in, for example, a ROM. The program executed by the electric device 200 or the power feed tap 300 has a modular configuration that includes each of the above-described processing units (the control unit 203, the electric-power notification unit 331, and the switch drive unit 333). As for the actual hardware, a control device, such as a CPU, reads the program from the above-described ROM and executes it so as to load and generate each of the above-described processing units on the storage device.

According to an embodiment, it is possible to automatically register the association relationship among a power feed tap, an outlet thereof, and electric device that is connected to the outlet.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

EXPLANATIONS OF LETTERS OR NUMERALS

1 DEVICE REGISTRATION SYSTEM
100 CONTROL SERVER APPARATUS
101 STORAGE UNIT
102 FIRST COMMUNICATION UNIT
103 SECOND COMMUNICATION UNIT
104 COMMUNICATION CONTROL UNIT
105 DETERMINING UNIT
106 ASSOCIATING UNIT
200 ELECTRIC DEVICE
201 STORAGE UNIT
202 COMMUNICATION UNIT
203 CONTROL UNIT
300 POWER FEED TAP
301, 301a to 301d OUTLET
322, 322a to 322d ELECTRIC POWER METER
330 CONTROL UNIT
331 ELECTRIC-POWER NOTIFICATION UNIT
340 COMMUNICATION UNIT
Ta DEVICE REGISTRATION TABLE

CITATION LIST

Patent Literature

Patent Literature 1: Japanese Patent Application Laid-open No. 2011-155445

The invention claimed is:

1. A device registration apparatus that communicates with an electric device and a power feed tap that measures, with respect to each of outlets to which the electric device is to be connected, an electric power that is fed to the electric device from the outlet, the device registration apparatus comprising:
circuitry configured to
transmit, to the electric device, a state shift command for shifting the electric device to a specific state;
receive, from the power feed tap, tap identification information for identifying the power feed tap, electric-power information that indicates an electric power that is measured at each of the outlets, and outlet identification information for identifying an outlet that corresponds to each piece of the electric-power information;
determine, when, in the electric-power information that is on each of the outlets and that is received from the power feed tap during a predetermined time period after the state shift command is transmitted, electric-power information of only one outlet indicates a pattern of a change in an electric power that corresponds to the state shift command for shifting the electric device to the specific state, that the electric device is connected to the outlet that corresponds to the electric-power information; and
store, in a storage unit, device identification information for identifying the electric device in association with outlet identification information on an outlet to which the electric device is determined to be connected and the tap identification information that is received together with the outlet identification information, wherein
the circuitry is configured to broadcast the state shift command with the device identification information attached thereto to control the electric device to shift to the specific state in accordance with the state shift command when the device identification information attached to the state shift command indicates its own electric device, and
the circuitry is configured, when the electric-power information of more than one outlet indicates the change in the electric power, to transmit the state shift command again.

2. The device registration apparatus according to claim 1, wherein the circuitry is further configured to
transmit, to the electric device, a device-information requirement command that causes the electric device to transmit device information,
receive the device information that is transmitted from the electric device in accordance with the device-information requirement command, and
store, in the storage unit, the device information received from the electric device in association with the device identification information.

3. The device registration apparatus according to claim 2, wherein
the circuitry is configured to broadcast the device-information requirement command with the device identification information attached thereto to control the electric device to transmit the device information in accordance with the device-information requirement command when the device identification information attached to the device-information requirement command indicates its own electric device.

4. The device registration apparatus according to claim 1, wherein the circuitry is configured such that the device identification information is previously acquired from the electric device and is stored in the storage unit.

5. The device registration apparatus according to claim 1, wherein
the circuitry is configured such that code information that indicates the state shift command is previously acquired from the electric device and is stored in the storage unit,
the circuitry is configured to transmit the code information as the state shift command to the electric device to control the electric device to receive the code information and shift to the specific state.

6. A device registration method performed by a device registration apparatus that communicates with an electric device and a power feed tap that measures, with respect to each of outlets to which the electric device is to be connected, an electric power that is fed to the electric device from the outlet, the device registration method comprising:
transmitting, to the electric device, a state shift command for shifting the electric device to a specific state;

receiving, from the power feed tap, tap identification information for identifying the power feed tap, electric-power information that indicates an electric power that is measured at each of the outlets, and outlet identification information for identifying an outlet that corresponds to each piece of the electric-power information;

determining, when, in the electric-power information that is on each of the outlets and that is received from the power feed tap during a predetermined time period after the state shift command is transmitted, electric-power information of only one outlet indicates a pattern of a change in an electric power that corresponds to the state shift command for shifting the electric device to the specific state, that the electric device is connected to the outlet that corresponds to the electric-power information; and storing, in a storage unit, device identification information for identifying the electric device in association with outlet identification information on an outlet to which the electric device is determined to be connected and the tap identification information that is received together with the outlet identification information, wherein the transmitting includes broadcasting the state shift command with the device identification information attached thereto to control the electric device to shift to the specific state in accordance with the state shift command when the device identification information attached to the state shift command indicates its own electric device, and the transmitting includes, when the electric-power information of more than one outlet indicates the change in the electric power, transmitting the state shift command again.

* * * * *